United States Patent
Kitahara et al.

(10) Patent No.: US 8,432,564 B2
(45) Date of Patent: Apr. 30, 2013

(54) PRINTING REQUEST APPARATUS, PRINTING SYSTEM AND PRINTING REQUEST METHOD

(75) Inventors: Yoshinao Kitahara, Nagano (JP); Hideki Morozumi, Nagano (JP); Kenji Sakuda, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 1529 days.

(21) Appl. No.: 11/494,492

(22) Filed: Jul. 28, 2006

(65) Prior Publication Data

US 2007/0024903 A1 Feb. 1, 2007

(30) Foreign Application Priority Data

Jul. 28, 2005 (JP) .................. P2005-218388

(51) Int. Cl.
*G06F 3/12* (2006.01)
(52) U.S. Cl.
USPC .................................... 358/1.15; 358/1.14
(58) Field of Classification Search .................. 358/1.13, 358/1.15; 348/207.2
See application file for complete search history.

(56) References Cited

U.S. PATENT DOCUMENTS

| | | | |
|---|---|---|---|
| 7,072,067 B2 * | 7/2006 | Leiman et al. | 358/1.15 |
| 7,464,333 B2 * | 12/2008 | Yamamoto | 715/273 |
| 2004/0070672 A1 * | 4/2004 | Iwami et al. | 348/207.2 |
| 2004/0196484 A1 | 10/2004 | Masumoto et al. | |
| 2005/0237568 A1 * | 10/2005 | Yun | 358/1.15 |
| 2006/0089993 A1 * | 4/2006 | Tsuruyama et al. | 709/227 |
| 2008/0309961 A1 * | 12/2008 | Aichi et al. | 358/1.15 |

FOREIGN PATENT DOCUMENTS

| | | |
|---|---|---|
| JP | 10-302075 A | 11/1998 |
| JP | 2003-127472 A | 5/2003 |
| JP | 2004-180031 A | 6/2004 |
| JP | 2004-185106 A | 7/2004 |
| JP | 2004-334522 A | 11/2004 |
| JP | 2006-102974 A | 4/2006 |
| JP | 2006-289908 A | 10/2006 |
| JP | 2007-011979 A | 1/2007 |

OTHER PUBLICATIONS

PrintEnhanced: 1 Service Template Version 1.01 (online, Nonpatent Document) 2002-2005.
UpnP Device Architecture Version 1.0 (online, Nonpatent Document) Jun. 28, 2006.
XHTML-Print (online, Nonpatent Document) Jun. 28, 2006.

* cited by examiner

*Primary Examiner* — Thomas J Lett
*Assistant Examiner* — Sunil Chacko
(74) *Attorney, Agent, or Firm* — Sughrue Mion, PLLC

(57) ABSTRACT

A printing request apparatus includes a first printing request generator, operable to generate a first printing request for printing information by a direct printing method; a second printing request generator, operable to generate a second printing request for printing information by an HTML-based printing method; and a printing controller, operable to select one of the first printing request generator and the second printing request generator and to cause the one of the first printing request generator and the second printing request generator to generate the corresponding printing request.

9 Claims, 10 Drawing Sheets

PRINTING REQUEST APPARATUS, PRINTING SYSTEM AND PRINTING REQUEST METHOD

BACKGROUND OF THE INVENTION

The present invention relates to a printing request apparatus, a printing system and a printing request method.

"PrintEnhanced" in which a printing function is actualized on Universal Plug and Play (UPnP (trademark)) has been proposed by a UPnP forum. "PrintEnhanced" describes the content and layout of a printing document by using HTML (Hyper Text Markup Language) Print and CSS (Cascading Style Sheet) PrintProfile.

At the same time, recently, the number of printers capable of a direct printing has been growing. In a direct printing system, without going through a personal computer, a digital still camera or the like is connected directly to a printer, and an image file in the digital still camera is transferred to the printer, thereby causing the printer to print an image based on the image data of the file. Particularly, a large number of "PictBridge"-compliant printer products is being sold. In such a direct printing method, printing conditions (the kind of paper, a paper size, a layout, the number of prints and the like) and an image file of a subject to be printed are specified within a printing request.

Although many of the existing direct printing systems are of a form in which a digital still camera or the like is connected to a printer by a USB cable, recently, a sending and reception of control information (a request, a response, a notice and the like) in the direct printing system via an IP network has been considered.

Particularly, in a case of PictBridge, PTP (Photo Transfer Protocol) is used to send and receive a file, such as an XML script file including the control information and an image file, but a direct printing system via the IP network is possible by using PTP/IP (PTP over IP).

Also, as in "PrintEnhanced" described heretofore, in an HTML-based printing method, which interprets a markup language, such as XHTML (extensive HTML) equivalent to HTML, or HTML-based data, such as an HTML subset or superset, and prints an HTML-based document thereof, it is possible to easily print the HTML-based data via the IP network by using HTTP (Hyper Text Transfer Protocol). For example, "PrintEnhanced", which uses UPnP (trademark) as a lower layer, is premised on a printing via the IP network.

Under such circumstances, henceforth, for example, in a computer network such as a home LAN or an office LAN, there is a possibility of a combination of a direct printing printer and an HTML-based printing printer or a presence of a printer which responds to both a direct printing and an HTML-based printing. Also, it can be assumed that DLNA (Digital Living Network Alliance) or the like provides a connection of various home appliances, a mobile device and the like to such a network, and that such printers as described heretofore are used from those appliances and devices besides a personal computer.

Consequently, in a case of a device which responds to both the direct printing method and the HTML-based printing method, it is necessary to select an appropriate printer or an appropriate printing method at the time of printing. However, a user of the home appliances or a like person lacks knowledge of a printer, and it is difficult for such a user to select the appropriate printer or the appropriate printing method.

SUMMARY

It is therefore an object of the invention to provide a printing request apparatus, printing system and printing request method which can automatically select an appropriate printer or an appropriate printing method and cause it to carry out a printing.

In order to achieve the object, according to the invention, there is provided a printing request apparatus comprising:

a first printing request generator, operable to generate a first printing request for printing information by a direct printing method;

a second printing request generator, operable to generate a second printing request for printing information by an HTML-based printing method; and a printing controller, operable to select one of the first printing request generator and the second printing request generator and to cause the one of the first printing request generator and the second printing request generator to generate the corresponding printing request.

With this configuration, it is possible to automatically select an appropriate printer or an appropriate printing method, and cause it to execute a printing.

The printing request apparatus may further include a plurality of application processors, each of which is operable to cause a display device to display at least an image and to supply a printing instruction to the printing controller The printing controller may select one of the first printing request generator and the second printing request generator in accordance with the printing instruction.

In this case, it is possible to automatically select an optimum printer or printing method for each application, and cause it to execute a printing.

The printing request apparatus may further include a layout specifier, operable to specify a layout. The printing controller may select one of the first printing request generator and the second printing request generator in accordance with the layout specified by the layout specifier.

In this case, it is possible to automatically select an optimum printer or printing method for a specified printing layout, and cause it to execute a printing.

In a case where selection information for selecting one of a prescribed number of predetermined layouts in the direct printing method includes layout information, the printing controller may select the first printing request generator when the layout specified by the layout specifier is identical with the one of the predetermined layouts.

In this case, it is possible to easily and swiftly carry out a layout specification within a printing request.

The printing controller may select one of the first printing request generator and the second printing request generator in accordance with whether or not a character is included in the information.

In this case, it is possible to automatically select an optimum printer or printing method for a specified subject to be printed, and cause it to execute a printing. That is, in a case in which a character is included in the subject to be printed, an HTML-based printing method, which can print an image and a character in a desired layout, is selected, thereby appropriately printing the subject to be printed.

The first printing request may include a printing request for PictBridge, and the second printing request may include a printing request for XHTML-Print.

In this case, the first or second printing request generator is selected in such a way as to utilize the advantage of both PictBridge which is relatively high in speed and XHTML-Print which is capable of an image and character layout.

According to the invention, there is also provided a printing system comprising:

the printing request apparatus which sends the printing request;

a first printer, operable to receive the first printing request from the printing request apparatus and to carry out a printing by the direct printing method; and a second printer, operable to receive the second printing request from the printing request apparatus and to carry out a printing by the HTML-based printing method.

In this case, it is possible to automatically select an appropriate printer or an appropriate printing method, and cause it to execute a printing.

According to the invention, there is also provided a printing request method comprising:

selecting one of an HTML-based printing method and a direct printing method;

generating a printing request for the selected printing method; and sending the generated printing request to a prescribed printer and causing the prescribed printer to print by the selected printing method.

In this case, it is possible to automatically select an appropriate printer or an appropriate printing method, and cause it to execute a printing.

DETAIL DESCRIPTION OF PREFERRED EMBODIMENTS

Embodiments of the invention will hereafter be described with reference to the drawings.
Embodiment 1

Figure 1:
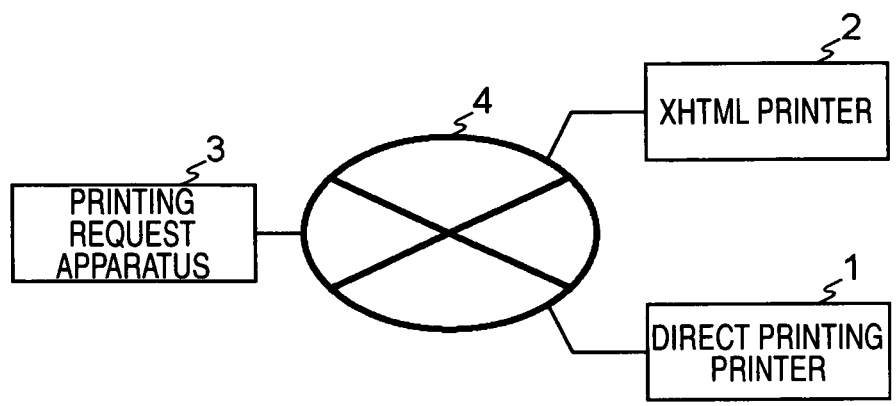
FIG. 1 is a diagram showing a configuration of a printing system according to an embodiment 1.

FIG. 1 is a block diagram showing a configuration of a printing system according to an embodiment 1 of the invention. In FIG. 1, a direct printing printer 1 is a printer which, being connected to a communication network 4, receives a printing request, and executes a direct printing which prints an image based on an image file specified by the printing request.

Also, an XHTML printer 2 is a printer which, being connected to the communication network 4, receives a printing request, and executes an HTML-based printing which interprets HTML-based data and prints an HTML-based document thereof. In an HTML-based printing method such as XHTML-Print, it is possible to print a character and an image in a desired layout.

Also, a printing request apparatus 3 is an apparatus which, being connected to the communication network 4, sends a printing request. As a form of the printing request apparatus 3, for example, a personal computer, a television broadcasting receiver, any other home appliance, a kiosk terminal, a cellular telephone or the like can be considered. Although FIG. 1 shows only one printing request apparatus 3, it is also acceptable that a plurality of the printing request apparatuses 3 is connected to the communication network 4.

A direct printing method such as PictBridge is a printing method which prints only an image with the exception of a standard character such as a date. In a case of the direct printing method, in order to specify a layout under printing conditions, it is sufficient to simply specify an item such as 1-up or 2-up, and it is not necessary to numerically specify the layout. That is, in the case of the direct printing method, the direct printing printer 1 calculates the printing position, printing size, aspect ratio and the like of the image in accordance with a paper size and a layout specification, and carries out a printing.

However, in XHTML-Print, the printing request apparatus 3 needs to numerically specify the positioning of a character and an image within XHTML data. That is, in the case of XHTML-Print, the printing request apparatus 3 includes layout information, obtained by numerically specifying a layout, in the XHTML data, while the XHTML printer 2 lays out printing details using a numerical value of the layout information. Consequently, the layout specification in XHTML-Print is more detailed and complicated than the layout specification in PictBridge.

As the communication network 4, it is also acceptable to employ a local area network (LAN) in a household, an office or the like, or a wide area network (WAN) such as an internet. As the communication network 4, it is also acceptable to employ a wired network, a wireless network, or a combination of both of them. In the embodiment 1, the communication network 4 is an IP (Internet Protocol) network.

Figure 2:
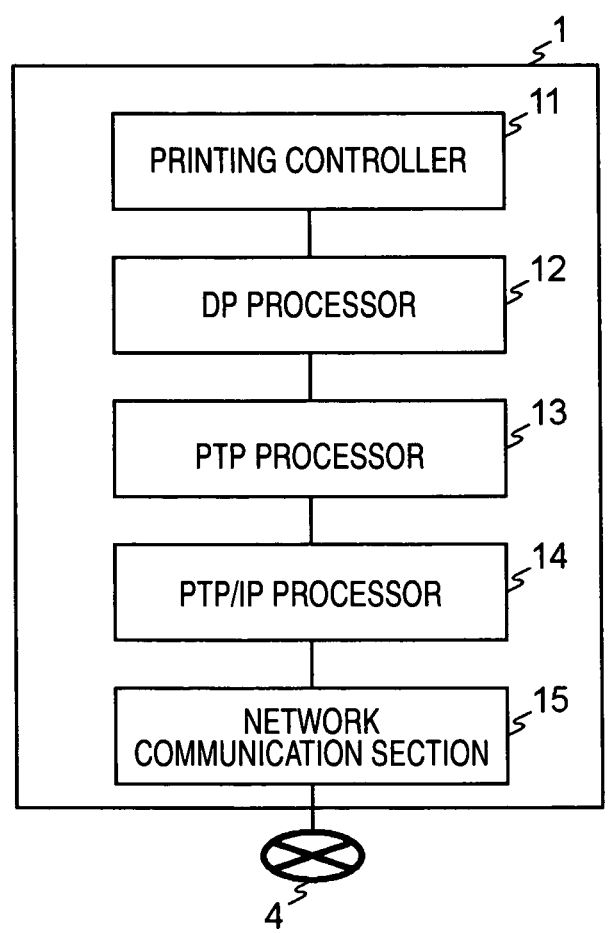
FIG. 2 is a diagram showing a configuration of a direct printing printer in FIG. 1.

FIG. 2 is a block diagram showing a configuration of the direct printing printer 1. The direct printing printer 1 shown in FIG. 2 has a printing controller 11, a DP processor 12, a PTP processor 13, a PTP/IP processor 14 and a network communication section 15.

The printing controller 11 is a section which controls a not-shown printing mechanism in such a way as to carry out a printing on printing paper or the like. Also, the DP processor 12 is a section which, based on a direct printing protocol such as PictBridge, generates and interprets an XML (extensive Markup Language) script including control information (a request, a response, a notice and the like). Also, the PTP processor 13 is a section which, by using PTP, sends an XML script file generated by the DP processor 12, and receives an XML script file and an image file which are interpreted by the DP processor 12. Also, the PTP/IP processor 14 is a section which converts a PTP command and response issued by the PTP processor 13 into an IP packet, and converts the IP packet into a PTP command and response. Also, the network communication section 15 is a section which, being connected to the communication network 4, includes a physical layer, an MAC (Medium Access Control) layer and a TCP/IP (Transmission Control Protocol/IP) layer.

The printing controller 11, the DP processor 12, the PTP processor 13, the PTP/IP processor 14, and the TCP/IP layer of the network communication section 15 are actualized by a program stored in a recording medium such as a ROM being loaded on a RAM and executed by a not-shown micro processing unit (MPU).

Figure 3:
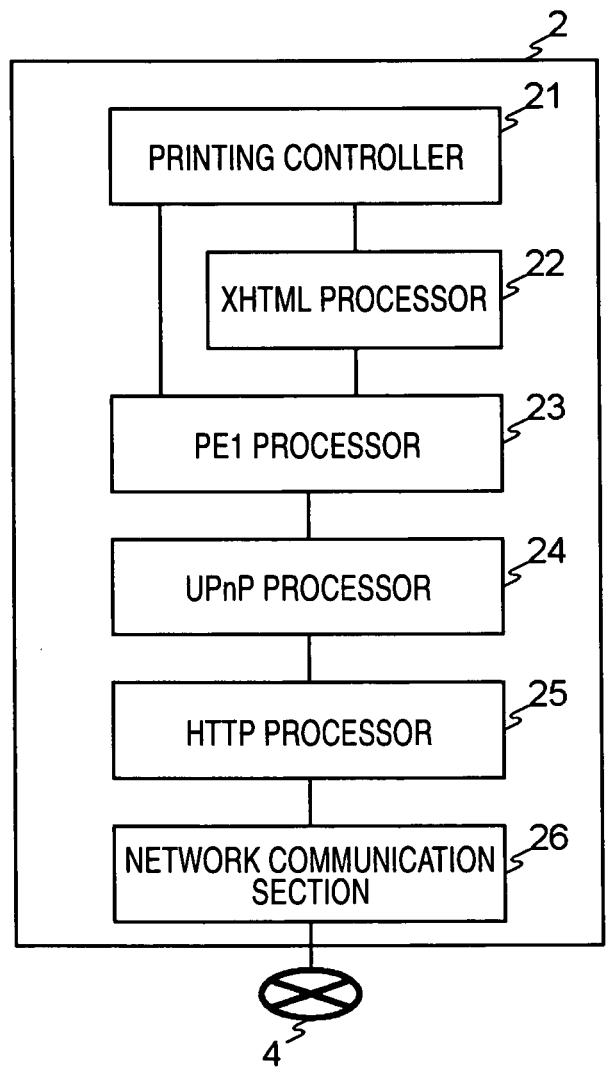
FIG. 3 is a diagram showing a configuration of an XHTML printer in FIG. 1.

FIG. 3 is a block diagram showing a configuration of the XHTML printer 2 in FIG. 1. The XHTML printer 2 shown in FIG. 3 has a printing controller 21, an XHTML processor 22, a PE1 processor 23, a UPnP processor 24, an HTTP processor 25 and a network communication section 26.

The printing controller 21 is a section which controls the not-shown printing mechanism in such a way as to carry out a printing on printing paper or the like. Also, the XHTML processor 22 is a section which interprets the XHTML data acquired based on PE1 (PrintEnhanced:1) which is a service on UPnP (trademark). Also, the PE1 processor 23 is a section which provides a printing service on UPnP (trademark) based on PE1 (PrintEnhanced:1). The PE1 processor 23, upon receiving a printing request, extracts printing condition information included in the printing request, and also acquires the XHTML data to be printed.

PE1 has a PUSH type printing request and a PULL type printing request, in which the PE1 processor 23, upon receiving the PUSH type printing request, notifies a printing request sender of a destination URI (Universal Resource Identifier) used to send the XHTML data to be printed at an HTTP POST command. However, the PE1 processor 23, upon receiving the PULL type printing request, acquires the XHTML data to be printed, from a place indicated by the URI included in the printing request, at an HTTP GET command issued by the HTTP processor 25.

The UPnP processor 24 is a section which carries out a connection process such as an allocation of an IP address to its own machine and a notification of the IP address of its own machine to a communication partner. Also, the HTTP processor 25 is a section which, by using HTTP, sends and receives a command and a response which are sent and received by the UPnP processor 24. The network communication section 26 is a section which, being connected to the communication network 4, includes a physical layer, an MAC layer and a TCP•UDP/IP (Transmission Control Protocol-User Datagram Protocol/IP) layer.

The printing controller 21, the XHTML processor 22, the PE1 processor 23, the UPnP processor 24, the HTTP processor 25, and the TCP•UDP/IP layer of the network communication section 26 are actualized by a program stored in a recording medium such as a ROM being loaded on a RAM and executed by the not-shown micro processing unit (MPU).

Figure 4:
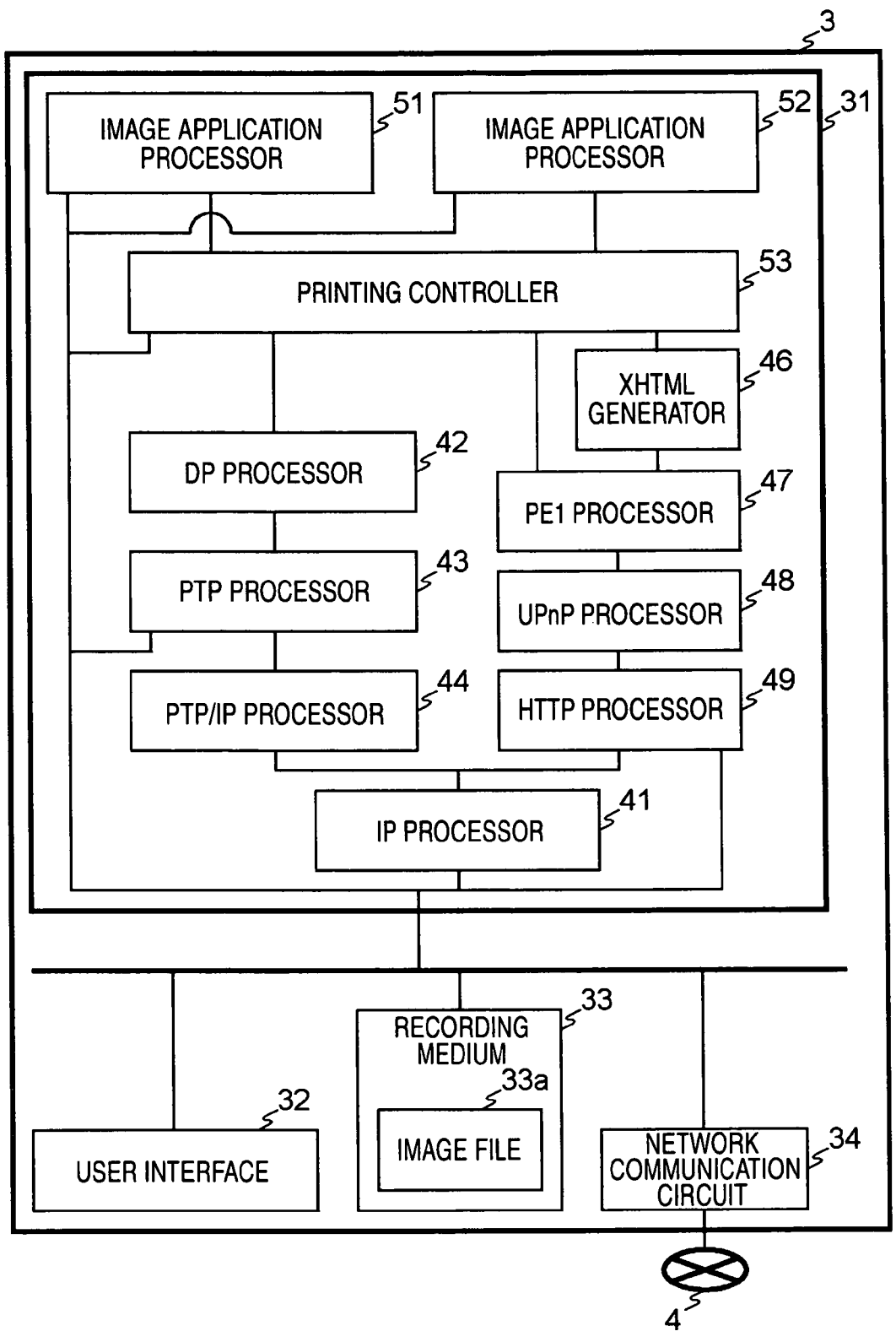
FIG. 4 is a diagram showing a configuration of a printing request apparatus in the embodiment 1.

FIG. 4 is a block diagram showing a configuration of the printing request apparatus 3 in the embodiment 1. The printing request apparatus 3 shown in FIG. 4 has an arithmetic processor 31, a user interface 32, a recording medium 33 and a network communication circuit 34.

The arithmetic processor 31 is actualized by a program stored in a recording medium such as a ROM being loaded on a RAM and executed by a not-shown arithmetic processing unit such as a CPU or an MPU.

The IP processor 41 is a section which carries out a processing of the TCP•UDP/IP layer. The DP processor 42 is a section which, based on a direct printing protocol such as PictBridge, generates and interprets an XML script including control information (a request, a response, a notice and the like). The DP processor 42 generates a printing request for the direct printing method. The PTP processor 43 is a section which, by using PTP, sends an XML script file and an image file 33a which have been generated by the DP processor 42, and receives an XML script file and an image file which are interpreted by the DP processor 42. Also, the PTP/IP processor 44 is a section which converts a PTP command and response issued by the PTP processor 43 into an IP packet, and converts the IP packet into a PTP command and response. By this means, PTPoverIP is actualized.

In the embodiment 1, the network communication circuit 34, the IP processor 41, the PTP/IP processor 44 and the PTP processor 43 constitute first communication means which establishes a communication path for sending and receiving the printing request for the direct printing method with respect to the direct printing printer 1.

Also, the XHTML generator 46 is a section which generates the XHTML data describing a subject to be printed. The PE1 processor 47 is a section which provides a printing service on UPnP (trademark) based on PE1 (PrintEnhanced:1). The PE1 processor 47 generates a printing request for the HTML-based printing method. PE1 regulates various actions, such as a printing request, a printing job cancellation and an acquisition of printer condition information, various parameters representing control information during printing, and the like. The PE1 processor 47 sends and receives the control information (a printing request and the like) during printing with respect to a PE1-compliant printer.

PE1 has a PUSH type printing request and a PULL type printing request. In a case of using the PUSH type printing request, the PE1 processor 47 sends the XHTML data to be printed to a URI, which is notified from a destination printer, at an HTTP POST command from the HTTP processor 49. However, in a case of using the PULL type printing request, the PE1 processor 47 includes a URI, which indicates a place to store the XHTML data to be printed, in the printing request. Also, in a case of PE1, layout information is included in the XHTML data, and the other printing conditions are sent and received as the parameters of PE1.

The UPnP processor 48 is a section which carries out a connection process etc. such as an allocation of an IP address to its own machine and a notification of the IP address of its own machine to a communication partner. Also, the HTTP processor 49 is a section which, by using HTTP, sends and receives a command and a response which are sent and received by the UPnP processor 48.

In the embodiment 1, the network communication circuit 34, the IP processor 41, the HTTP processor 49 and the UPnP processor 48 constitute second communication means which establishes a communication path for sending and receiving the printing request for the XHTML printing method with respect to the XHTML printer 2.

The image application processor 51 is a processor which, being actualized by an application program being executed, handles at least the image file 33a. In the embodiment 1, the image application processor 51 functions as an HTML browser.

The image application processor 52 is a processor which, being actualized by an application program being executed, handles the image file 33a. In the embodiment 1, the image application processor 52 functions as an image viewer.

The printing controller 53 is a section which, upon receiving a printing instruction from the image application processor 51, 52, selects either one of the direct printing method and the XHTML printing method, and causes the selected printing method to carry out a process of printing contents based on the printing instruction, in conjunction with either one of the printers 1 and 2. That is, the printing controller 53 selects either one of the DP processor 42 and the PE1 processor 46 and causes it to generate a printing request.

Also, the user interface 32, having a display device and an input device, as well as exhibiting a variety of information to a user, detects a user's operation. As the display device, a display, an indicator and the like are used as appropriate. As the input device, various switches, a track pad, a remote controller (including a communication circuit), a keyboard and the like are used as appropriate. As the input device, it is also acceptable to use a voice recognition system.

Also, the recording medium 33 is a device, such as a semiconductor memory in which data such as the image file 33a can be stored, a magnetic recording medium such as a hard disk drive, an optical recording medium or a magnetooptical recording medium. The recording medium 33 may be fixed to the device 3, and may also be made attachable/removable. The image file 33a is a file which includes image data of a JPEG (Joint Photographic Experts Group) type, an EXIF (EXchangeable Image File format) type, a TIFF (Tagged Image File Format) type or the like.

Also, the network communication circuit 34 is a circuit which, being connected to the communication network 4, has a physical layer and an MAC layer.

Figure 5:
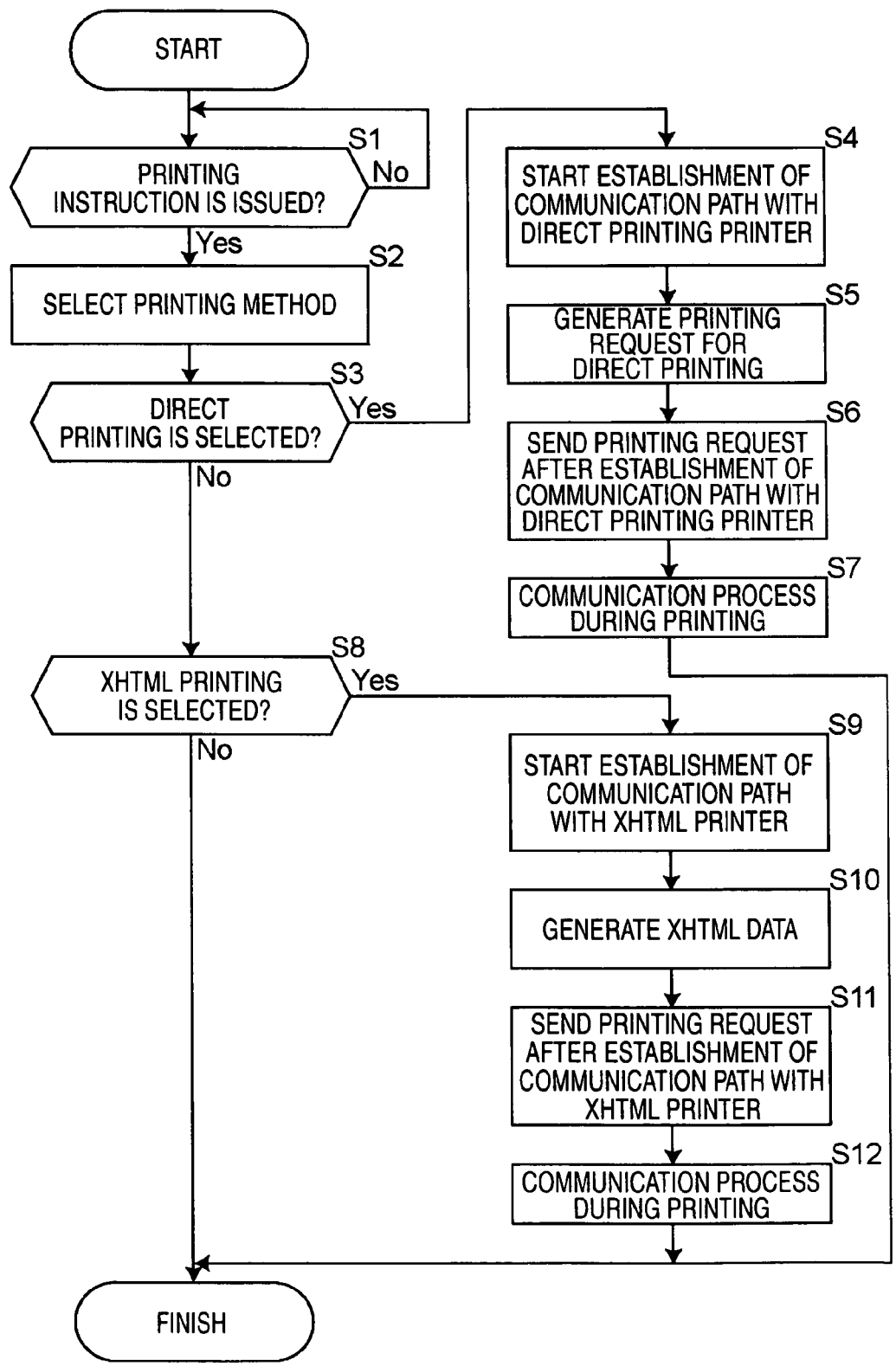
FIG. 5 is a diagram illustrating an operation of the printing request apparatus according to the embodiment 1.

Next, a description will be given of an operation of each apparatus (mainly the printing request apparatus 3) in the printing system described heretofore. FIG. 5 is a flowchart illustrating an operation of the printing request apparatus according to the embodiment 1.

The printing controller 53 of the printing request apparatus 3 monitors whether or not a printing instruction has occurred in the image application processor 51, 52 or the like (step S1) and, if the printing instruction occurs, executes a process. corresponding to the printing instruction. The printing instruction is issued, for example, when a user's prescribed operation of the user interface 32 (for example, a depression of a printing button on a GUI) is detected by the image application processor 51, 52 or the like.

First, the printing controller 53, when the printing instruction occurs, selects a printing method in accordance with the kind of the image application processor or the like in which the printing instruction has occurred (step S2).

At this time, in a case in which the printing instruction has been issued by the image application processor 51 functioning as the HTML browser, the printing controller 53 selects the XHTML printing method as the printing method (the PE1 processor 47 as printing request generating means). However, in a case in which the printing instruction has been issued by the image application processor 52 functioning as the image viewer, the printing controller 53 selects the direct printing method as the printing method (the DP processor 42 as printing request generating means).

Figure 6:
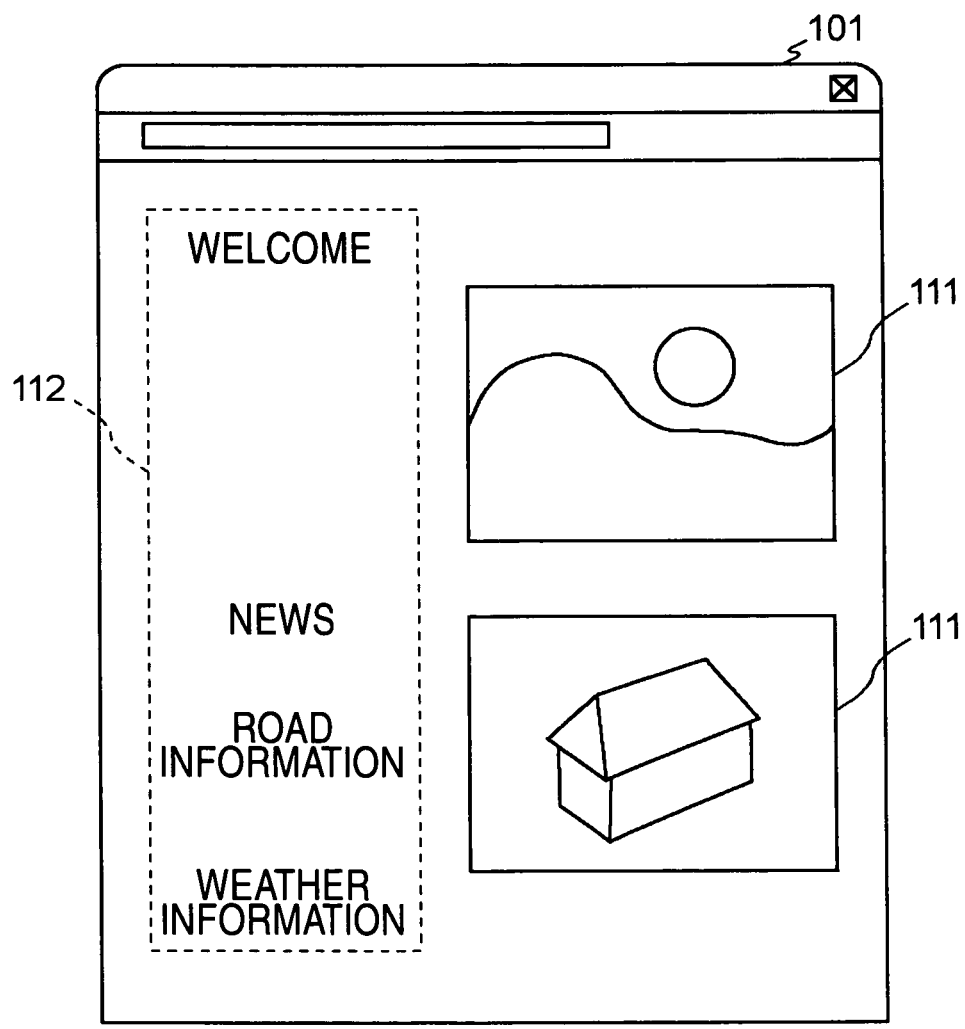
FIG. 6 is an example of a window displayed in the embodiment 1.

FIG. 6 shows an example of a window displayed on the display device of the user interface 32 based on the image application processor 51 in the embodiment 1. As shown in FIG. 6, an image 111 and a character group 112 are laid out and displayed in a window 101 of the HTML browser and, preferably, printed with the layout maintained during printing.

Figure 7:
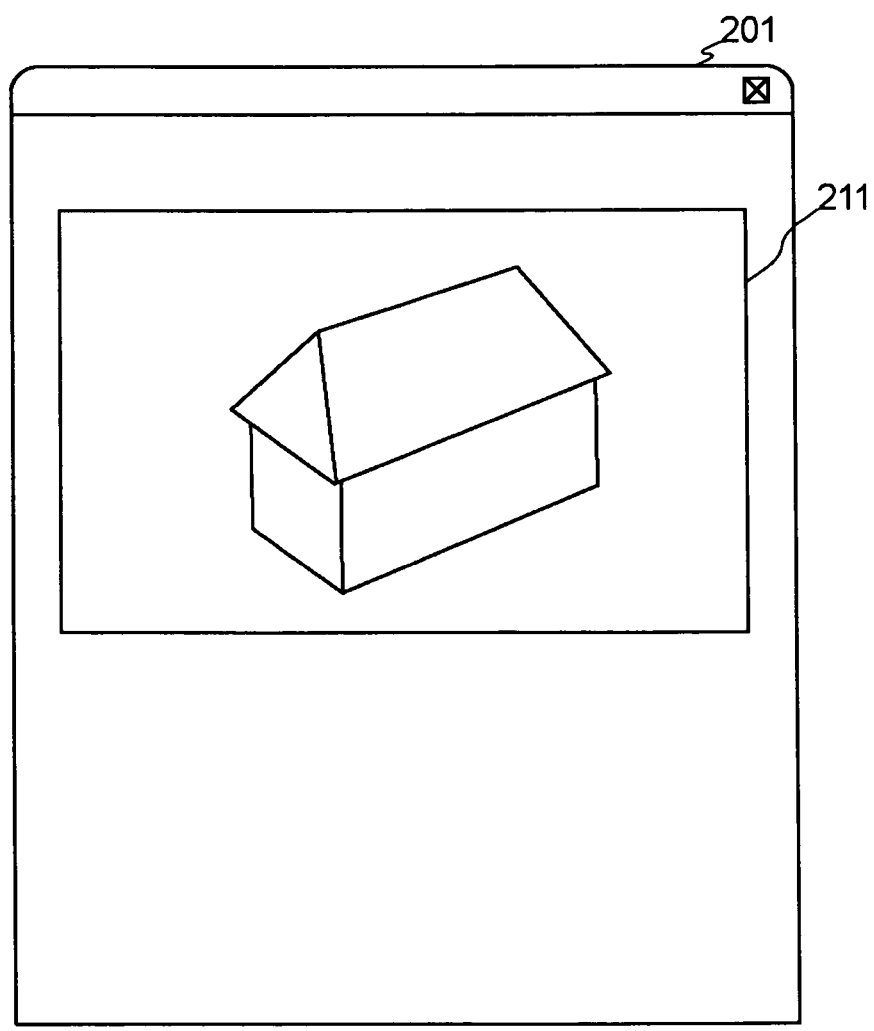
FIG. 7 is an example of a window displayed in the embodiment 1.

FIG. 7 shows an example of a window displayed on the display device of the user interface 32 based on the image application processor 52 in the embodiment 1. Because, as shown in FIG. 7, one desired image 211 is displayed in a window 201 of the image viewer, it is sufficient that only the image is printed during printing.

Consequently, in the case in which the printing instruction has been issued by the image application processor 51 functioning as the HTML browser, the printing controller 53 selects the XHTML printing method which is capable of a layout in which a character and an image are mixed. However, in the case in which the printing instruction has been issued by the image application processor 52 functioning as the image viewer, as there is no need to print a character or specify a detailed layout, the printing controller 53 selects the direct printing method which is higher in speed than the XHTML printing method. The direct printing method, as it specializes in an image printing and has default printing conditions previously prepared on a printer side, unlike the XHTML printing method, does not need to carry out a layout specification. Therefore, in a case of printing only an image, a direct printing method such as PictBridge is higher in speed.

Next, the printing controller 53, when having selected the direct printing method as the printing method (that is, when having selected the DP processor 42) (step S3), causes it to start a process for establishing a communication path in a communication layer, such as the TCP/IP layer, with respect to the direct printing printer 1 (step S4). In the process at this time, for example, a communication path is established and maintained through which a communication at a prescribed TCP port is carried out between the IP processor 41 and the network communication section 15, so as to send and receive the PTP command and response.

In parallel with this process, the printing controller 53 causes the DP processor 42 to generate a printing request (step S5). At this time, in accordance with the printing instruction, the DP processor 42 generates an XML script acting as a printing request including a specification of the image file 33a and printing conditions (a paper size, the kind of paper, a layout selection, the number of prints). As the printing conditions at this time, it is also acceptable to employ default ones, or those which the user has input via the user interface 32.

After that, when the DP processor 42 becomes ready to send and receive the PTP command and response with respect to the direct printing printer 1, first, it carries out a connection process between it and the DP processor 12 of the direct printing printer 1, wherein one of the two DP processors 12 and 42 recognizes the other as a communication partner using a direct printing protocol. Then, the DP processor 42 sends the generated printing request to the DP processor 12 of the direct printing printer 1.

This printing request is sent and received, as one file, between the PTP processor 43 of the printing request apparatus 3 and the PTP processor 13 of the direct printing printer 1. At this time, data on PTP, through being converted by the PTP/IP processors 44 and 14, is transmitted as an IP packet on the communication network 4 acting as the IP network. At this time, the IP packet is sent by the IP processor 41, and reaches the network communication section 15 of the direct printing printer 1 via the network communication circuit 34 and the communication network 4.

In this way, when the printing request is received by the DP processor 12 of the direct printing printer 1, the DP processor 12 interprets the printing request, specifies the image file 33a, extracts the printing conditions, and then sends a request to send the image file 33a, to the DP processor 42. The request to send is transmitted in a direction opposite to and through the same path as that of the printing request described heretofore, and reaches the DP processor 42, wherein the image file 33a specified is sent to the PTP processor 13 of the direct printing printer 1 by the PTP processor 43 (step S7).

When the image file 33a is received by the PTP processor 13 of the direct printing printer 1, the printing controller 11 subjects the image file to a color conversion, a halftoning process and the like as appropriate, and controls the not-shown printing mechanism based on the data, thereby carrying out a printing on printing paper or the like.

When the printing or the transmission of the image data 33a is complete, a completion notice is sent from the DP processor 12 and received by the DP processor 42 of the printing request apparatus 3 (step S7). The DP processor 42 of the printing request apparatus 3, upon receiving the completion notice, finishes the process.

However, the printing controller 53, in a case of having selected the XHTML printing method as the printing method (that is, in a case of having selected the DP processor 42) (step S8), causes it to start a process for establishing a communication path on UPnP (trademark) with respect to the XHTML printer 1 (step S9). In the process at this time, for example, a communication path is established and maintained through which a discovery process is carried out between the UPnP processor 48 and the UPnP processor 24 of the XHTML printer 1, so as to send and receive a PE1 command and response and the XHTML data.

Then, in parallel with this process, the printing controller 53 causes the XHTML generator 46 to generate the XHTML data (step S10). At this time, in accordance with the printing instruction, the XHTML generator 46 generates the XHTML data acting as a printing request including a specification of the image file 33a, a character and layout information.

After that, when the PE1 processor 47 becomes ready to send and receive the PE1 command and response and the XHTML data with respect to the XHTML printer 2, it sends a printing request having specified therein the printing conditions to the XHTML processor 22 of the XHTML printer 2 (step S11). As the printing conditions at this time, it is also acceptable to employ default ones, or those which the user has input via the user interface 32.

This printing request is sent and received between the UPnP processor 47 of the printing request apparatus 3 and the UPnP processor 24 of the XHTML printer 2. This printing request is sent and received between the lower layer HTTP processor 49 and the HTTP processor 25 of the XHTML printer 2. At this time, data on HTTP is transmitted as the IP packet on the communication network 4 that is the IP network. At this time, the IP packet is sent by the IP processor 41, and reaches the network communication section 26 of the XHTML printer 2 via the network communication circuit 34 and the communication network 4.

In this way, when the printing request is received by the PE1 processor 23 of the XHTML printer 2, the PE1 processor 23 interprets the printing request and, as well as extracting the printing conditions, receives or acquires the XHTML data to be printed.

When the XHTML data is acquired by the PE1 processor 23, the XHTML processor 22 interprets the XHTML data, extracts a specification of the image file 33a, a character and layout information, and causes the HTTP processor 25 to send a request to send the image file 33a, to the HTTP processor 49. The request to send is transmitted in a direction opposite to and through the same path as that of the printing request described heretofore, and reaches the HTTP processor 49, wherein the image file 33a specified is sent to the HTTP processor 25 of the XHTML printer 2 by the HTTP processor 49 (step S12).

When the image file 33a is received by the HTTP processor 25 of the XHTML printer 2, the printing controller 21 generates printing intermediate data in which an image of the image file and a character specified by the printing request are arranged in a layout specified by the printing request, subjects the printing intermediate data to a color conversion process, a halftoning process and the like as appropriate, generates printing control data, and controls the not-shown printing mechanism based on the data, thereby carrying out a printing on printing paper or the like.

When the printing or the transmission of the image data 33a is complete, a completion notice is sent from the PE1 processor 23 and received by the PE1 processor 47 of the printing request apparatus 3 (step S12). The PE1 processor 47 of the printing request apparatus 3, upon receiving the completion notice, finishes the process.

As described heretofore, according to the embodiment 1, the DP processor 42 generates the printing request for the direct printing method which prints an image based on an image file specified by the printing request, while the PE1 processor 47 generates the printing request for the HTML-based printing method which interprets and prints the HTML-based data. The printing controller 53, when generating a printing request, selects either one of the DP processor 42 and the PE1 processor 47 and causes it to generate the printing request. By this means, it is possible to automatically select an appropriate printer or an appropriate printing method and cause it to execute a printing.

Also, according to the embodiment 1, the image application processor 51, 52, as well as causing a prescribed display device to display at least an image, supplies a printing instruction to the printing controller 53. Then, the printing controller 53, when generating a printing request corresponding to the printing instruction, selects either one of the DP processor 42 and the PE1 processor 47 in accordance with the kind of the image application processor. By this means, it is possible to automatically select an optimum printer or printing method for each application processing means and cause it to execute a printing.

Also, according to the embodiment 1, the DP processor 42 generates a printing request for PictBridge, while the PE1 processor 47 generates a printing request for XHTML-Print. By this means, the DP processor 42 or the PE1 processor 47 is appropriately selected in such a way as to utilize the advantage of both PictBridge which is relatively high in speed and XHTML-Print which is capable of an image and character layout.

Embodiment 2

A printing system according to an embodiment 2 of the invention is provided with a printer 5 having both a direct printing function and an XHTML-Print function in place of the printers 1 and 2 of the printing system according to the embodiment 1.

Figure 8:
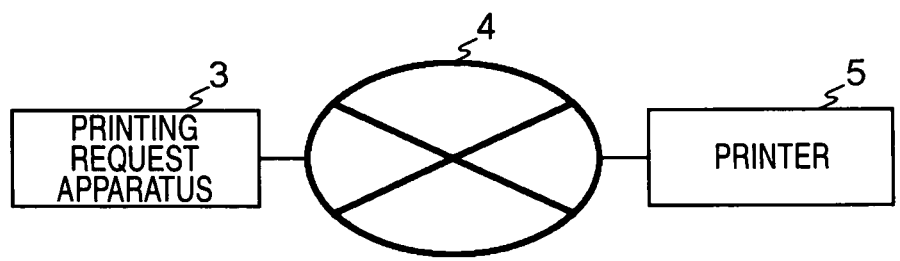
FIG. 8 is a diagram showing a configuration of a printing system according to an embodiment 2.

FIG. 8 is a block diagram showing a configuration of the printing system according to the embodiment 2 of the invention. In FIG. 8, the printer 5 is a printer which both a function to carry out a printing by the direct printing method and a function to carry out a printing by XHTML-Print. As a printing request apparatus 3 and a communication network 4 are the same as those in the embodiment 1, a description thereof will be omitted.

Figure 9:
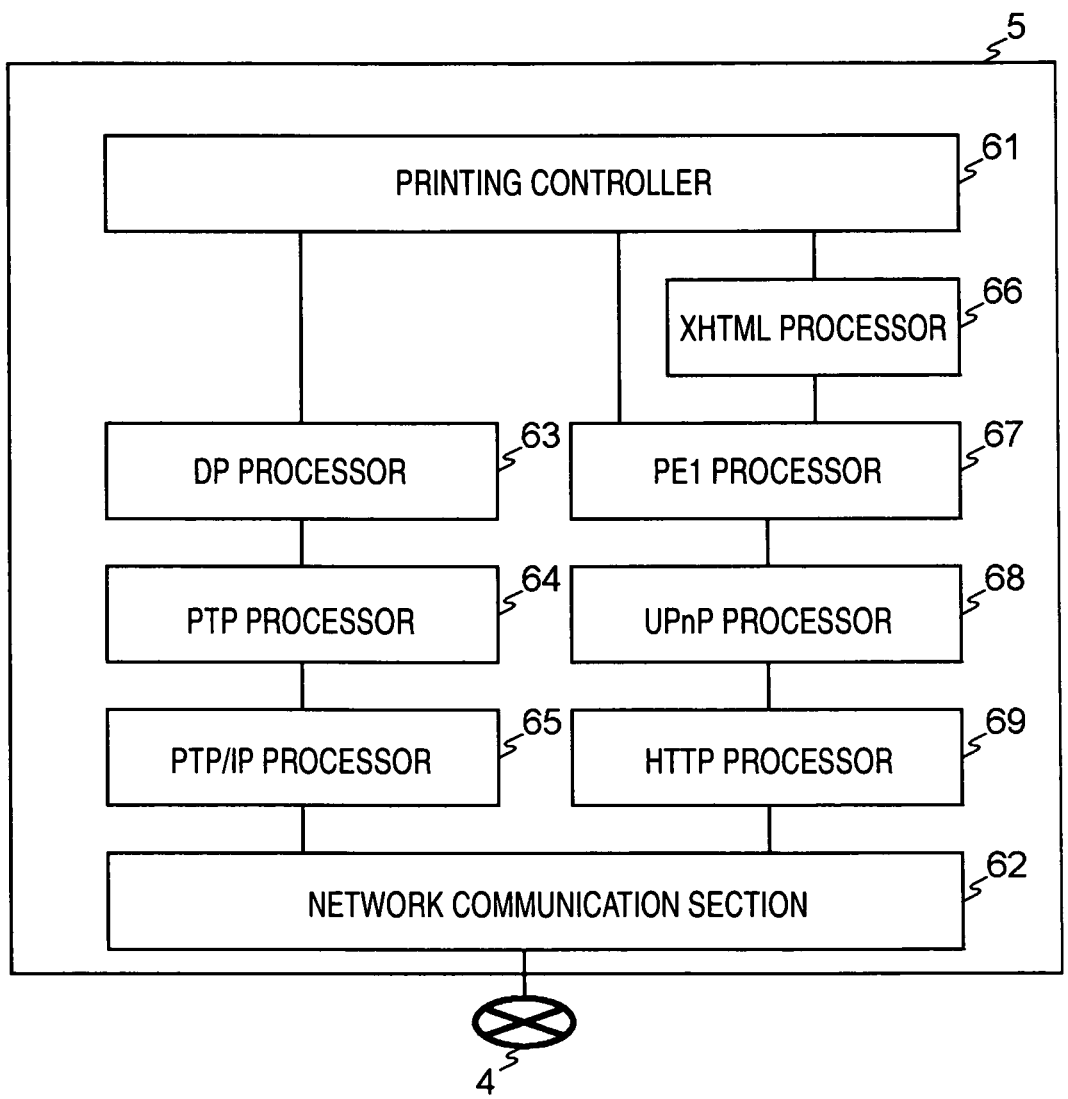
FIG. 9 is a diagram showing a configuration of a printer in the embodiment 2.

FIG. 9 is a block diagram showing a configuration of the printer 5 according to the embodiment 2. In FIG. 9, a printing controller 61 is a section which, based on data from a DP processor 63 or data from an XHTML processor 66, controls a not-shown printing mechanism in such a way as to carry out a printing on printing paper or the like. A network communication section 62 is a section which, being connected to the communication network 4, includes a physical layer, an MAC layer and a TCP•UDP/IP layer.

As the DP processor 63, a PTP processor 64 and a PTP/IP processor 65 are the same respectively as the DP processor 12, the PTP processor 13 and the PTP/IP processor 14 in the embodiment 1, a description thereof will be omitted.

Also, as the XHTML processor 66, a PE1 processor 67, a UPnP processor 68 and an HTTP processor 69 are the same respectively as the XHTML processor 22, the PE1 processor 23, the UPnP processor 24 and the HTTP processor 25 in the embodiment 1, a description thereof will be omitted.

Next, a description will be given of an operation of each apparatus in the printing system described heretofore.

In the embodiment 2, a printing request is sent from the printing request apparatus 3 to the printer 5 both in the case of the direct printing and in the case of XHTML-Print.

In the printer 5, the printing request for the direct printing method is supplied from the network communication section 62 to the DP processor 63 via the PTP/IP processor 65 and the PTP processor 64. However, the printing request for XHTML-Print is supplied from the network communication section 62 to the PE1 processor 67 via the HTTP processor 69 and the UPnP processor 68. For example, the network communication section 62 sends and receives communication data of the upper layer PTP/IP processor 65 and communication data of the upper layer HTTP processor 69 at the differing TCP or UDP ports, and sorts them.

As the other operations of each apparatus are the same as those in the embodiment 1, a description thereof will be omitted.

As described heretofore, according to the embodiment 2, it is possible to obtain the same advantageous effects as those in the embodiment 1.

Embodiment 3

A printing system according to an embodiment 3 of the invention is one obtained by modifying the internal configuration of the printer 5 in the printing system according to the embodiment 2.

Figure 10:
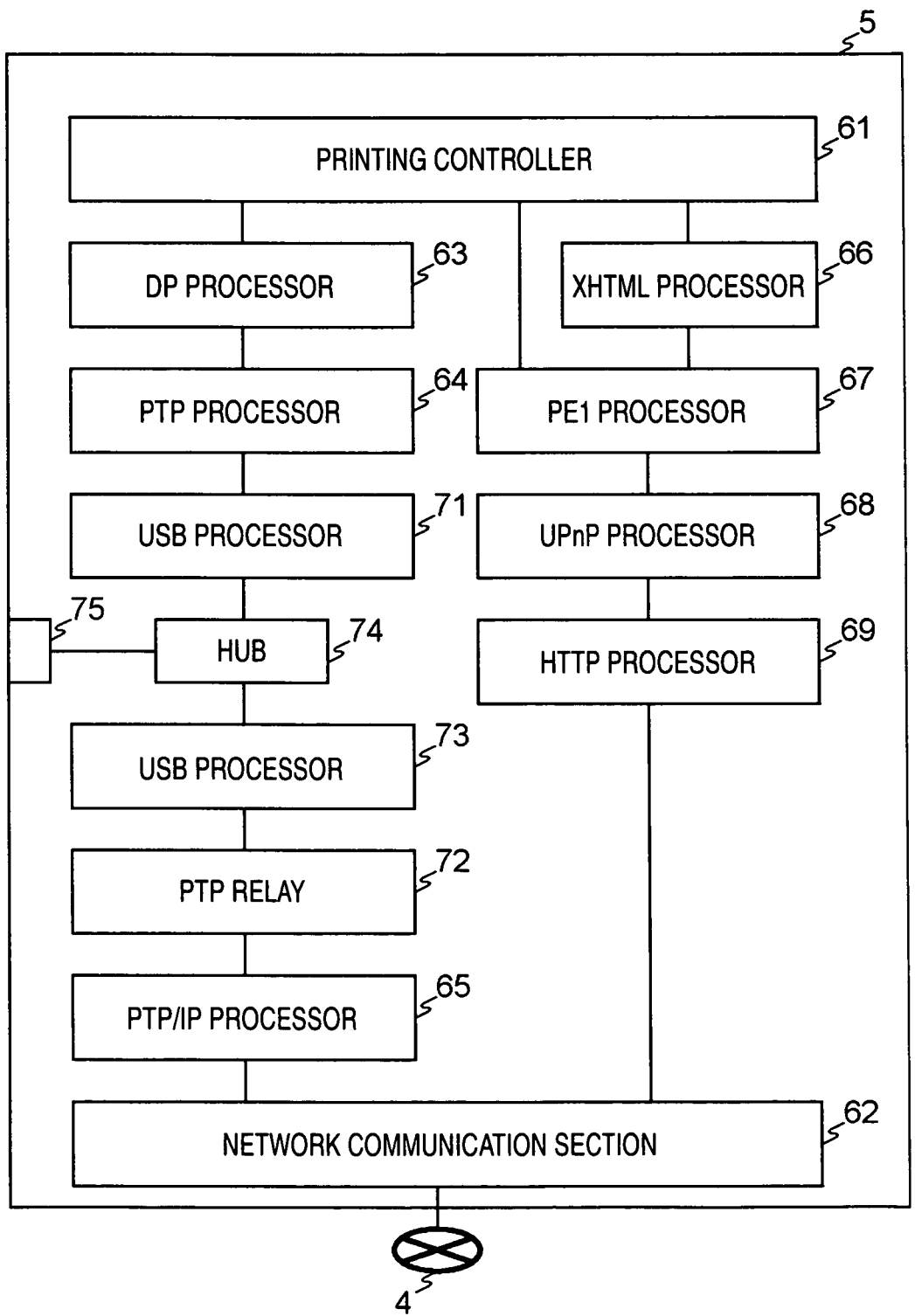
FIG. 10 is a diagram showing a configuration of a printer in an embodiment 3.

FIG. 10 is a block diagram showing a configuration of a printer 5 according to the embodiment 3. In FIG. 10, a USB processor 71 is a USB communication circuit which functions as a USB host. Also, a PTP relay 72, having a PTP initiator, which sends and receives a PTP command and response via a PTP/IP processor 65, and a PTP responder, which sends and receives a PTP command and response via a USB processor 73, sends the PTP command and response, which it receives via the PTP/IP processor 65, via the PTP/IP processor 73, and sends the PTP command and response, which it receives via the USB processor 73, via the PTP/IP processor 65. The USB processor 73 is a USB communication circuit which functions as a USB device. A hub 74, being a USB hub, is a circuit which relays a communication between one upper USB host and one or a plurality of lower USB devices. Herein, the USB processor 71 is the upper USB host, and the USB processor 73 and a USB device connected to a connector 75 are the lower USB devices. The connector 75 is a connector to which the USB device is connected via a USB cable.

As a printing request apparatus 3, a communication network 4, and the other components in the printer 5 are the same as those of the embodiment 2, a description thereof will be omitted.

Next, a description will be given of an operation of each apparatus in the printing system described heretofore.

In the embodiment 3, a printing request is sent from the printing request apparatus 3 to the printer 5 both in the case of the direct printing and in the case of XHTML-Print.

In the printer 5, the printing request for the direct printing is supplied from a network communication section 62 to a USB processor 63 via the PTP/IP processor 65, the PTP relay 72, the USB processor 73, the hub 74, the USB processor 71 and a PTP processor 64. However, the printing request for XHTML-Print is supplied from the network communication section 62 to a PE1 processor 67 via an HTTP processor 69 and a UPnP processor 68. The network communication section 62 sends and receives communication data of the PTP/IP processor 65 and communication data of the HTTP processor 69 at the differing TCP or UDP ports.

In the printer 5 of the embodiment 3, for example, by connecting a "PictBridge"-compliant digital still camera or the like to the connector 75 via the USB cable, the direct printing becomes possible between the digital still camera and the printer 5. In this case, the printing request for the direct printing method is supplied from the digital still camera to the DP processor 63 via the hub 74, the USB processor 71 and the PTP processor 64.

As the other operations of each apparatus are the same as those in the embodiment 2, a description thereof will be omitted.

As described heretofore, according to the embodiment 3, it is possible to obtain the same advantageous effects as those in the embodiment 2.

Although each embodiment described heretofore is a preferred example of the invention, the invention is not limited thereto, and various modifications and variations are possible without departing from the scope of the invention.

For example, in each embodiment described heretofore, as the image application processor 51 (52), it is also acceptable to provide a processor which specifies a layout during printing. In this case, the image application processor 51 (52) acting as the layout specification means specifies a layout during printing. Then, the printing controller 53 selects either one of the DP processor 42 and the PE1 processor 47 in accordance with the kind of the layout specified by the image application processor 51 (52). By this means, it is possible to automatically select an optimum printer or printing method for the specified printing layout, and cause it to carry out a printing.

Particularly, the printing controller 53, in a case in which selection information for selecting any one of a prescribed number of predetermined layouts in the direct printing method is layout information, may be configured to select the DP processor 42 when the layout specified by the layout specification means conforms to any one of the predetermined layouts.

By this means, it is possible to easily and swiftly carry out a layout specification within a printing request. For example, as a printer for a direct printing such as PictBridge previously has a recording medium label printing function such as a CD-R printing or a layout printing function such as a label form printing, in a case in which such a special layout has been specified, the DP processor 42, that is, the direct printing method is specified. By this means, it is possible to carry out a printing more easily and at a higher speed than in a case of generating the XHTML data having the information of a complicated layout.

Also, in each embodiment described heretofore, the printing controller 53 may also be configured to select either one of the DP processor 42 and the PE1 processor 47 in accordance with whether or not a character is included in the subject to be printed. In this case, it is possible to automatically select an optimum printer or printing method for the specified subject to be printed and cause it to carry out a printing. That is, the HTML-based printing method which can print an image and a character in a desired layout is selected, thereby appropriately printing the subject to be printed.

Also, in each embodiment described heretofore, an example of the HTML-based printing method includes XHTML-Print, but another HTML-based printing method is also acceptable. In this case as well, data described in a markup language is supplied to a printer, as the subject to be printed, by using PE1 or a corresponding protocol.

Also, in each embodiment described heretofore, an example of the direct printing method includes PictBridge, but another direct printing method is also acceptable. As another direct printing method, there is a printer vendor-specific direct printing method. In this case as well, an image file is transferred directly to a printer and, in the printer, an image processing such as a color conversion is executed on the image data of the image file, thereby generating printing data.

Also, in each embodiment described heretofore, it is acceptable to add a function wherein, in spite of a selection by the printing controller 53, either one of the DP processor 42 and the PE1 processor 47 is compulsorily selected by a user's operation of the user interface 32.

The invention is applicable to, for example, a device which sends a printing request to a printer in a case in which a printing by both the direct printing method and the HTML-based printing method is possible in a home LAN, an office LAN or the like.

What is claimed is:

1. A printing request apparatus comprising:
   a first printing request generator, operable to generate a first printing request for printing information by a direct printing method using Photo Transfer Protocol (PTP);
   a second printing request generator, operable to generate a second printing request for printing information by an HTML-based printing method using HTTP;
   a printing controller; and
   application processors, which are different from each other and each of which is operable to cause a display device to display at least an image included in the information and to supply a printing instruction to the printing controller,
   wherein the printing controller determines that one of the application processors which supplies the printing instruction to the printer is an image application processor performing as HTML browser using HTTP:
      causes the first printing request generator to generate the first printing request when the one of the application processors which supplies the printing instruction to the printer is not the image application processor performing as the HTML browser using HTTP, and
      causes the second printing request generator to generate the second printing request when the one of the application processors which supplies the printing instruction to the printer is the image application processor performing as the HTML browser using HTTP.

2. The printing request apparatus according to claim 1, wherein
   the first printing request includes a printing request for PictBridge, and
   the second printing request includes a printing request for XHTML-Print.

3. A printing system comprising:
   the printing request apparatus according to claim 1 which sends the printing request;
   a first printer, operable to receive the first printing request from the printing request apparatus and to carry out a printing by the direct printing method; and
   a second printer, operable to receive the second printing request from the printing request apparatus and to carry out a printing by the HTML-based printing method.

4. A printing request apparatus comprising:
   a first printing request generator, operable to generate a first printing request for printing information by a direct printing method;
   a second printing request generator, operable to generate a second printing request for printing information by an HTML-based printing method;
   a layout specifier, operable to specify a first layout or a second layout for the information, the first layout being different from the second layout; and
   a printing controller:
      operable to select one of the first printing request generator and the second printing request generator and to cause the one of the first printing request generator and the second printing request generator to generate the corresponding printing request;
      operable to cause the first printing request generator to generate the first printing request when the first layout is specified by the layout specifier; and
      operable to cause the second printing request generator to generate the second printing request when the second layout is specified by the layout specifier,
      wherein the printing controller selects the second printing request generator in a case where character data to be printed is included in the information.

5. The printing request apparatus according to claim 4, wherein
   in a case where selection information for selecting one of a prescribed number of predetermined layouts in the direct printing method includes layout information, the printing controller cause the first printing request generator to generate the first printing request when the first layout is identical with the one of the predetermined layouts.

6. The printing request apparatus according to claim 4, wherein
   the printing controller selects one of the first printing request generator and the second printing request generator in accordance with whether or not a character is included in the information.

7. The printing request apparatus according to claim 4, wherein
   the first printing request includes a printing request for PictBridge, and
   the second printing request includes a printing request for XHTML-Print.

8. A printing system comprising:
   the printing request apparatus according to claim 4 which sends the printing request;
   a first printer, operable to receive the first printing request from the printing request apparatus and to carry out a printing by the direct printing method; and
   a second printer, operable to receive a second printing request from the printing request apparatus and to carry out a printing by the HTML-based printing method.

9. A printing request method comprising:
   determining one of application processors which supplies the printing instruction to a prescribed printer is an image application processor performing as a HTML browser using HTTP or not, wherein the application processors are configured to cause a display device to display an image and are different from each other;
   selecting a direct printing method using Photo Transfer Protocol (PTP), when the one of the application processors which supplies the printing instruction to the printer is not the image application processor performing as the HTML browser using HTTP;
   selecting an HTML-based printing method using HTTP, when the one of the application processors which supplies the printing instruction to the printer is the image application processor performing as the HTML browser using HTTP;
   generating a printing request for the selected printing method; and
   sending the generated printing request to the prescribed printer and causing the prescribed printer to print by the selected printing method, wherein the second application processor is an image application processor performing as a HTML browser using HTTP.

\* \* \* \* \*